United States Patent
Nagase et al.

[19]

[11] Patent Number: 6,072,791
[45] Date of Patent: Jun. 6, 2000

[54] CDMA SPREAD SPECTRUM MOBILE PHONE

[75] Inventors: Taku Nagase, Tokyo; Osamu Kato; Gen-Ichiro Ota, both of Kanagawa, all of Japan

[73] Assignee: Matsushita Electric Industrial Co., Ltd., Osaka, Japan

[21] Appl. No.: 08/938,113

[22] Filed: Sep. 26, 1997

[51] Int. Cl.[7] .................................................. H04B 10/04
[52] U.S. Cl. ........................ 370/342; 370/335; 375/200
[58] Field of Search ................................... 370/311, 313, 370/342, 328, 335, 318, 320, 438, 441; 455/214, 39, 422, 426, 511, 515, 522; 375/206, 208, 200, 216, 220, 295, 315, 316

[56] References Cited

U.S. PATENT DOCUMENTS

| | | | |
|---|---|---|---|
| 5,414,385 | 5/1995 | Worsham, Jr. ........................... | 455/214 |
| 5,678,227 | 10/1997 | Connell et al. ......................... | 370/311 |
| 5,742,636 | 4/1998 | Fukushi .................................. | 370/311 |
| 5,760,699 | 6/1998 | Saka et al. .............................. | 370/311 |
| 5,835,489 | 11/1998 | Moriya et al. .......................... | 370/342 |

*Primary Examiner*—Dang Ton
*Assistant Examiner*—Tuan Q Ho
*Attorney, Agent, or Firm*—Brown Raysman Millstein Felder & Steiner LLP

[57] ABSTRACT

A spread spectrum portable telephone apparatus operates with long wait times and with little battery depletion while waiting. A mobile unit receiver receives and detects radio signals, analog-to-digital (AD) converts the detected reception signals, waveform-shapes the converted signals, despreads and decodes the waveform-shaped signals with a spread signal, frame-resolves the decoded signals, and extracts reception date from the frame-resolved signals. A data receiver is included which has, for both a pager channel and a communications channel, a narrow band AD converter circuit, a narrow band reception filter for waveform-shaping the AD converted signals, and a correlator which despreads and decodes the waveform-shaped signal using a spread code generated by a low speed spread code generator circuit. When waiting, calls to the apparatus are waited for with the power turned on only to the paging channel data receiver.

6 Claims, 4 Drawing Sheets

CDMA SPREAD SPECTRUM MOBILE PHONE

BACKGROUND OF THE INVENTION

1. Field of the Invention

The present invention pertains to a spread spectrum type portable telephone apparatus which uses a spread spectrum scheme and which is used in digital radio communications with automobile telephones and portable telephones, etc.

2. Prior Art

The spread spectrum scheme in the present invention is a scheme wherein, by means of a code division multiplexing access (CDMA) mode, transmission data are spectrum spread, subjected to multiplexing processing, and transmitted as radio signals. Known transmitters and receivers in spread spectrum type portable telephone apparatuses are made so that, even when in the wait state for monitoring a pager channel, circuits are always used which have the same broad bands and high speeds as the communications channels. An example of such a conventional spread spectrum portable telephone apparatus is diagrammed in FIGS. 3 and 4. FIG. 3 is a block diagram that depicts the configuration of the base station transmitter in a conventional spread spectrum portable telephone apparatus. FIG. 4 is a block diagram that depicts the configuration of the mobile unit receiver in a conventional spread spectrum portable telephone apparatus.

First of all, with reference to FIG. 3, the configuration of the bas e station transmitter in a conven-tional spread spectrum type portable telephone apparatus is described. In FIG. 3, 201 is a base station transmitter which makes radio transmissions to a plurality of mobile units. 202 is a frame assembler circuit that takes the transmission data from each line or the paging information and assembles that into a frame format together with control information. 203 is a spread code generator circuit that generates spread codes (specific to each system) which are allotted to each of the apparatuses that spread transmission data. 204 is a multiplier that multiplies the transmission data or paging data by the spread codes.

Moreover, 205 is an adder circuit that takes spread transmission data or paging information and puts that together into one structure; 206 is a band limiting filter that waveform shapes the data output from the adder circuit; 207 is a DA converter circuit that converts the data output from the band limiting filter to an analog signal; 208 is a mixer that modulates the carrier wave signal with the transmission data and outputs a radio signal; 209 is a carrier wave generator circuit that generates a carrier wave signal for transmitting the radio signal; 210 is a power amplifier circuit that amplifies the power of the radio signal in order to transmit it; and 211 is a radio signal transmission antenna.

The operation of the base station transmitter unit of a conventional spread spectrum portable telephone apparatus will be described with reference to FIG. 3. First of all, in the base station transmitter unit 201, the transmission data on the various lines, i.e., 1, 2, . . . , n, that are sent through the communications channel are assembled by the frame assembler circuit 202 into a transmission frame format to which has been attached various kinds of control information, etc., thereafter multiplied in the multiplier circuit 204 with a spread code generated by the spread code generator circuit 203 and spread into a broad band signal.

Furthermore, the spread transmission data are put together into one structure by the adder circuit 205, the output of which is waveform shaped by the band limiting filter 206, and converted into an analog signal by the DA converter circuit 207. The transmission data that have been converted to an analog signal are converted (modulated), in the mixer 208, to a modulated signal having the frequency of the carrier wave that is output from the carrier wave generator circuit 209. [This signal] is then amplified by the power amplifier circuit 210 and radio transmitted from the transmission antenna 211.

Furthermore, the paging information that is sent by the paging channel for the purpose of calling a mobile unit, after being programmed into a transmission frame format, with various control information, etc., attached thereto in the frame assembler circuit 202, is multiplied by a spread code having the same speed as the communications channel and generated by the spread code generator circuit 203, for paging channel use, in the multiplier 204.

The spread paging channel signal is band limited by the band limiting filter 206 that has the same band as the communications channel, converted to an analog signal by the DA converter circuit that is the same as [for] the communications channel, converted (modulated) by the mixer to a modulated signal having the same carrier wave frequency as [for] the communica-tions channel that is output from the carrier wave generator circuit 209, amplified by the power amplifier circuit 210 that is common with the communications channel, and radio transmitted from the transmission antenna 211.

Next the configuration of the mobile unit receiver of a conventional spread spectrum portable telephone apparatus will be described with reference to FIG. 4. In FIG. 4, 212 is a mobile unit receiver that receives radio signals from the base station transmitter 201. 213 is a reception antenna therefor. 214 is a low noise amplifier circuit that amplifies the reception data (or paging information) received from the reception antenna 213. And 216 is a detection circuit that detects and demodulates the reception data using a signal having the station generated frequency.

Moreover, 215 is a station generator circuit that generates a signal having the station generated frequency. 217 is an AD converter circuit that converts the detected analog signal to a digital signal. 218 is a reception filter that waveform shapes the digital signal received. 219 is a correlator that despreads (correlates) the waveform shaped digital signal using a spread code. 220 is a spread code generator circuit that generates a spread code (specific to each system) that is apportioned to each apparatus. 221 is a frame resolving circuit that extracts reception data from the frame format. And 222 is a controlling means for controlling the spread code generator circuit 220.

Next the operation of the mobile unit receiver of a conventional spread spectrum portable telephone apparatus will be described with reference to FIG. 4. In the mobile unit receiver 212, the incoming call status is monitored so that the paging channel is received while waiting, and the communications channel is received during communications. First, the operation while waiting will be described. The paging channel signal that is captured by the reception antenna 213 is amplified by the low noise amplifier 214, detected and demodulated, in the detector circuit 216, by means of a signal having the station generated frequency that is output from the station generator circuit 215, and converted into a base band signal.

The paging channel signal, after being converted to a base band signal, is converted to a digital signal through the AD converter circuit 217 that is the same as [for] the communications channel, and is waveform shaped by the reception filter 218 that is the same as [for] the communications channel. The waveform shaped paging channel signal is despread (correlated) in the correlator 219 using the spread code, and the paging information is extracted through the frame resolving circuit 221.

The operation of a call in a case where, during paging channel reception, a call to said mobile unit has been detected will be described next. The circuits of the mobile unit receiver 212 that are used for receiving the communications channel signal are the same circuits as are used for receiving paging channel signals. More specifically, the received communications channel information is received and processed through the same circuits and over the same paths as is the paging channel signal, and the received data are extracted by the frame resolving circuit 221. Accordingly, any further detailed description hereof is omitted inasmuch as it is the same as the description given above.

SUMMARY OF THE INVENTION

However, in conventional spread spectrum portable telephone apparatuses described above, in the wait state, it is necessary always to monitor a paging channel that has just as broad a band as does the communications channel. In order to do so, high speed operations are required in the receiver circuits, and power consumption is great, so that batteries are rapidly depleted, and the relative waiting time becomes short, all of which constitute problems.

The present invention was devised for the purpose of resolving the problems in the aforeindicated prior art, that is, for the purpose of providing a spread spectrum portable telephone apparatus in which there is little battery depletion during waiting times and which features long wait times.

The spread spectrum portable telephone apparatus in the present invention is provided, in the base station transmitter thereof, with transmission means that transmit a paging channel having a narrower band than the band of the communications channel, and in the mobile unit receiver thereof, with reception means that receive a paging channel having a narrower band than the band of the communications channel, and is made so that the power to the reception means for the communications channel is turned off while waiting, so that a call is detected by the reception of the narrow band paging channel, and so that the power is turned on to the reception means for the communications channel.

By using the present invention, a spread spectrum portable telephone apparatus that features little battery depletion during waiting times and the ability to reserve long waiting times will be obtained.

According to an aspect of the present invention, a CDMA type of mobile unit receiver has means for receiving and detecting radio signals transmitted in the CDMA mode, and data reception means for AD converting the detected reception signals, waveform shaping them, despreading and decoding them with a spread code, frame analyzing them, and extracting the reception data, fashioned so that the said data reception means are equipped with data reception means not only for a communication channel but also for a paging channel that has a narrower band, and so that, when waiting, only the said paging channel data reception means have the power turned on to them, waiting for an incoming call, featuring operations whereby, in the mobile unit receiver, the operating frequency of the circuit elements that operate while waiting is made low, by which means power consumption can be reduced.

According to another aspect of the present invention, the said data reception means for the paging channel are made up of a low speed AD converter circuit that AD converts the received signals and outputs digital paging signals, a narrow band reception filter that waveform shapes the said AD converted paging signals, and a correlator that despreads and decodes the said waveform shaped paging signals with a spread code generated by a low speed spread code generating circuit, featuring operations whereby, in the mobile unit receiver, the operating frequency of the circuit elements that operate while waiting is made low, by which means the power consumption can be reduced.

According to another aspect of the present invention, a CDMA type of base station transmitter that has data transmission means for taking the various transmission data from a plurality of lines and programming each of those into a frame format, for multi-plying [it] with a spread code specific to each line to make spread signals, waveform shaping the said spread signals, DA converting [them] to make analog signals, and transmitting them as radio signals modulated with a carrier wave, is fashioned so that the said data transmission means are equipped with data transmission means for a narrow band paging channel as well as for the communications channel and is made so that paging signals are transmitted to mobile units in which only the paging channel data reception means have power turned on to them, featuring operations whereby it is possible to call a mobile unit in which the power has only been turned on to the circuit elements for the paging channel.

According to another aspect of the present invention, the said data transmission means for the paging channel are made up of a multiplier that takes the paging information that has been programmed in a frame format and multiplies it with a spread code generated by the low speed spread code generating circuit, a narrow band band restricting filter that waveform shapes the said spread signal, a DA converter circuit that converts the said waveform shaped digital signal into an analog signal, and a mixer that modulates the said analog signal with a carrier wave and transmits that as a radio signal, featuring operations whereby it is possible to call a mobile unit in which the power has only been turned on to the circuit elements for the paging channel.

According to another aspect of the present invention, the CDMA type of mobile unit receiver in accordance with claim 1 above, the said data reception means are equipped with data reception means for a narrow band pager channel as well as for the reception [sic] channel, and so that, in the CDMA type of base station transmitter as per claim 3 above, the said data transmission means are equipped with data transmission means for a narrow band pager channel as well as for the communications channel, featuring operations whereby it is possible to obtain a spread spectrum portable telephone apparatus in which the waiting time of the mobile unit can be made and extended.

DETAILED DESCRIPTION OF THE PREFERRED EMBODIMENTS

Figure 1:
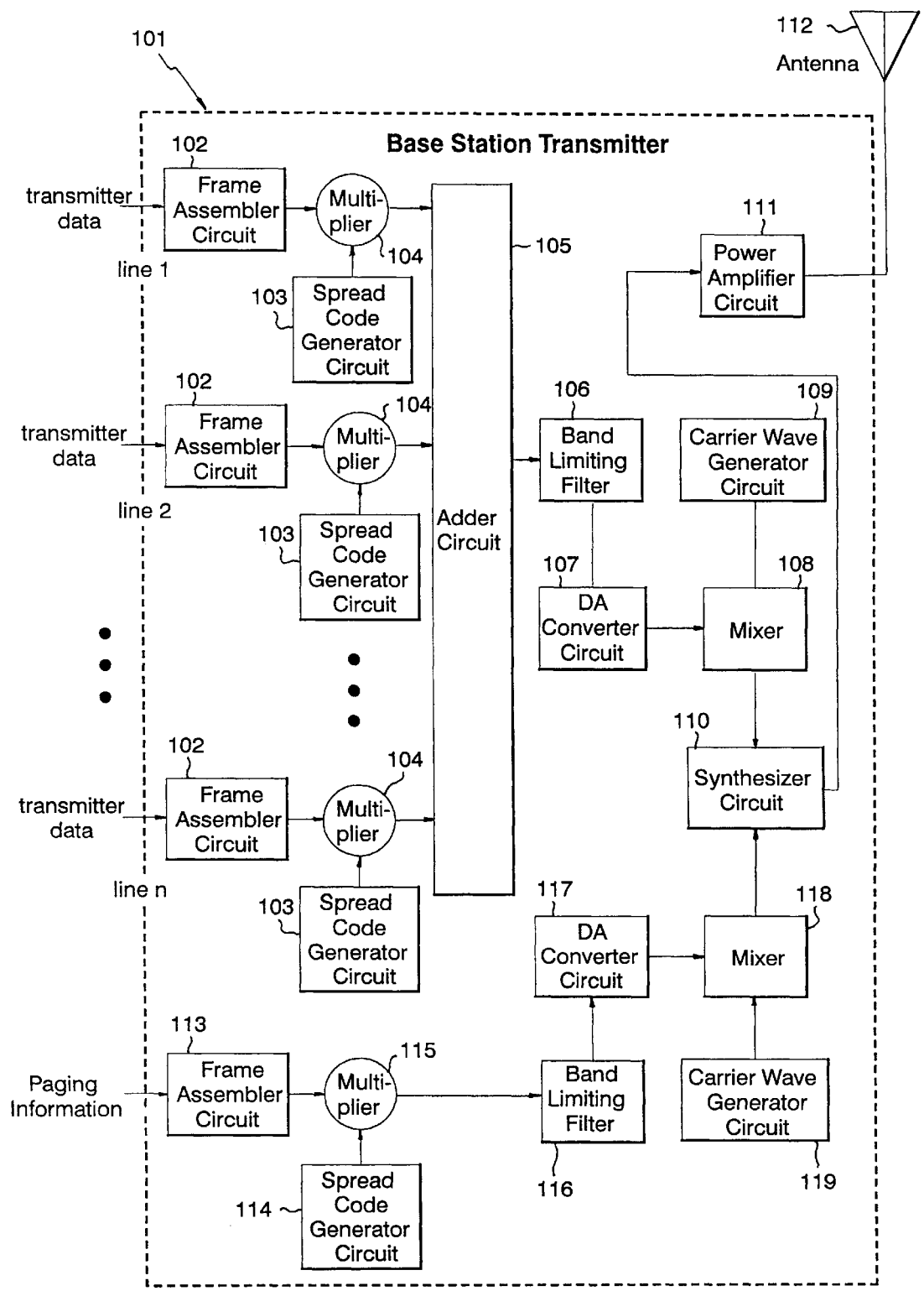
FIG. 1 is a block diagram depicting the configuration of the base station transmitter of the spread spectrum portable telephone apparatus in one embodiment of the invention.
Figure 2:
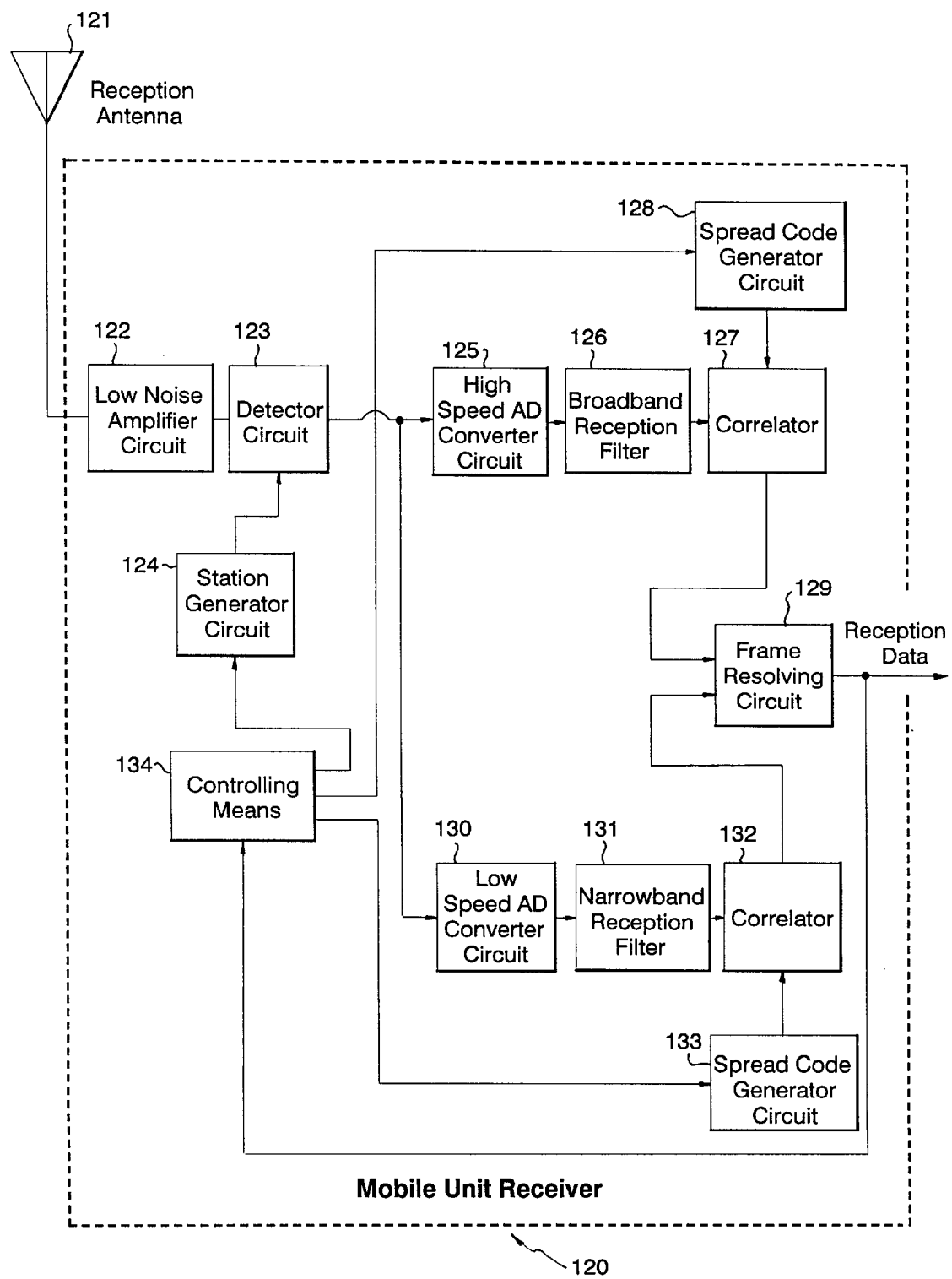
FIG. 2 is a block diagram depicting the configuration of the mobile unit receiver in the spread spectrum portable telephone apparatus in one embodiment of the invention.
Figure 3:
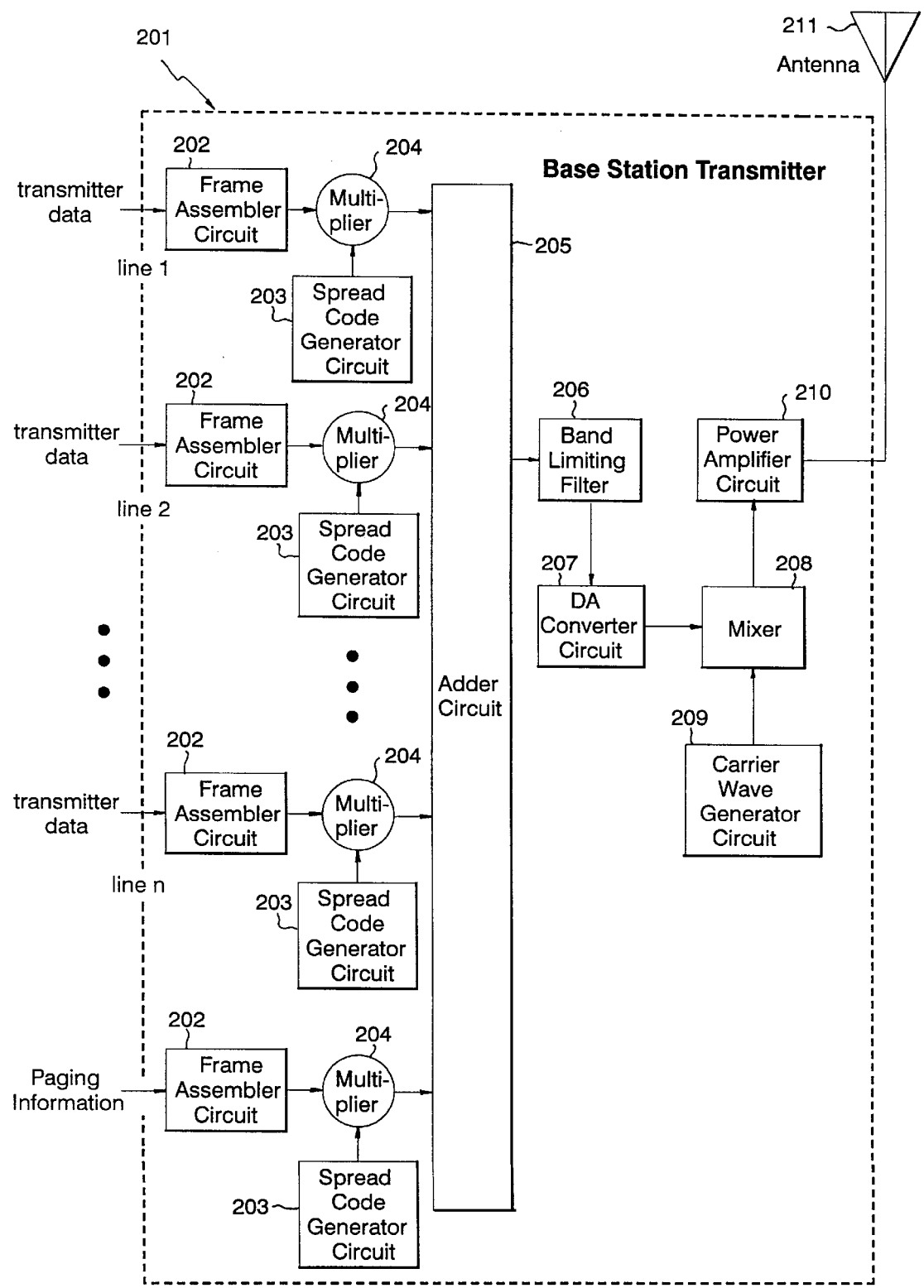
FIG. 3 is a block diagram that depicting the configuration of the base station transmitter in a conventional spread spectrum portable telephone apparatus.
Figure 4:
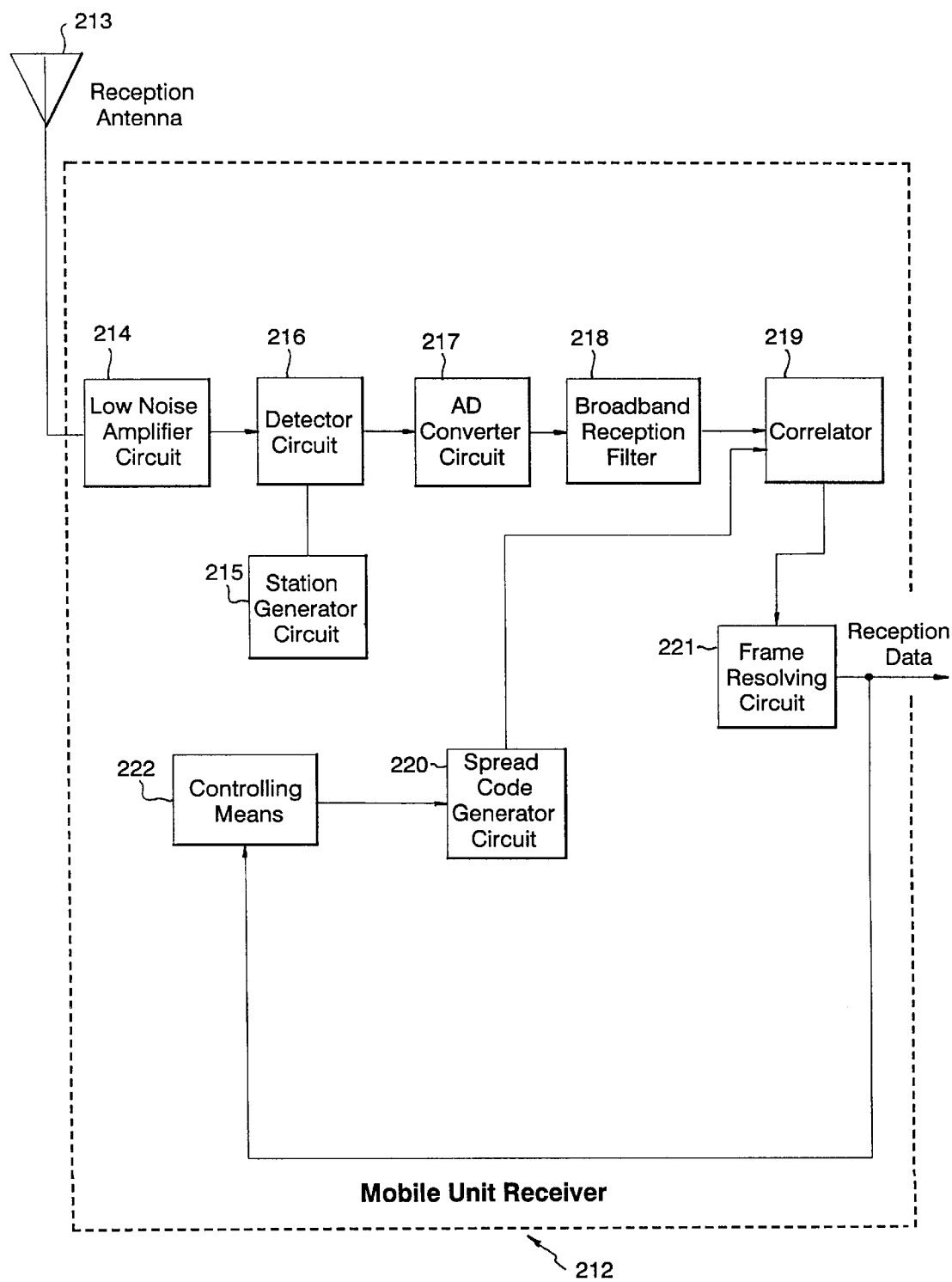
FIG. 4 is a block diagram that depicting the configuration of the mobile unit receiver in a conventional spread spectrum portable telephone apparatus.

Described in detailed in the following is a configuration of an embodiment of the present invention based on FIGS. 1 and 2 in the attached drawings. FIG. 1 is a block diagram depicting the configuration of the base station transmitter of the spread spectrum portable telephone apparatus in one embodiment of the present invention. FIG. 2 is a block diagram depicting the configuration of the mobile unit receiver in the spread spectrum portable telephone apparatus in said embodiment of the present invention. The spread spectrum portable telephone apparatus in one embodiment of the present invention is made up of the base station transmitter 101 diagrammed in FIG. 1 and the mobile unit receiver 120 diagrammed in FIG. 2.

First, the configuration of the base station transmitter of the spread spectrum portable telephone apparatus in an embodiment of the present invention is described with reference to FIG. 1. In the base station transmitter 101 diagrammed in FIG. 1, 102 is a frame assembler circuit that takes transmission data from various lines (line 1, line 2, ..., line n) and assembles them in a frame format together with control information. 103 is a spread code generator circuit that generates a spread code that spreads trans-mission data and makes the data broad band. 104 is a multiplier that multiplies the spread code and the transmission data, spreading [said data]. And 105 is an adder circuit that puts the spread transmission data together in one structure.

Moreover, 106 is a band limiting filter that waveform shapes the transmission data output from the adder circuit 105. 107 is a DA converter circuit that converts the waveform shaped digital data to an analog signal. 108 is a mixer that outputs a radio signal after modulating a carrier wave frequency with the analog transmission data. 109 is a carrier wave generator circuit that generates a carrier wave frequency that modulates the trans-mission data to a high frequency in order to radio transmit [said data]. 110 is a synthesizer circuit that synthesizes the modulated transmission data together with the modulated paging channel signal. 111 is a power amplifier circuit that amplifies the power of the radio signal in order to transmit it from the antenna. And 112 is a radio signal transmission antenna.

Moreover, 113 is a frame assembler circuit for the paging channel which assembles the paging information into a frame format together with control information. 114 is a spread code generator circuit for the paging channel that generates a spread code that spreads and makes broad band the paging information that is at a slower speed than the spread code generated by the spread code generator circuit for the communications channel. 115 is a multiplier that multiplies the spread code and the paging information, spreading [said paging information]. 116 is a band limiting filter that waveform shapes the spread paging information. 117 is a DA converter circuit having a narrower band than the DA converter circuit 107 for the communications channel that converts the paging information of the waveform shaped digital signal to an analog signal. 118 is a mixer that modulates the carrier wave signal with the analog paging information and outputs a radio signal. 119 is a carrier wave generator circuit that generates a carrier wave frequency that modulates the analog paging information to a high frequency in order to radio-transmit it.

Described next is the operation of the base station transmitter of the spread spectrum portable telephone apparatus configured as in the foregoing with reference to FIG. 1. To begin with, in the base station transmitter 101, the transmission data on lines 1, 2, ..., n that are sent through the communications channel are programmed into a transmission frame format, to which have been added various kinds of control information, etc., by the frame assembler circuit 102. Thereupon, [said data] are multiplied in the multiplier 104 by a spread code that is specific to each line, that has been apportioned to each line, and that has been generated by the spread code generator circuit, and are spread to a broad band signal.

The signals that are spread line by line, that is, 1, 2, ..., n, are added by the adder circuit 105 and put together into one structure. The output thereof is band limited by the band limiting filter 106 and waveform shaped, then converted to an analog signal by the DA converter circuit 107 and output to the mixer 108. The communications channel transmission data that have been converted to an analog signal are converted (modulated) in the mixer 108 to a modulated signal at a carrier wave frequency that has been output by the carrier wave generator circuit 109, then synthesized by the synthesizer circuit 110 to a paging channel signal, amplified by the power amplifier circuit 111, and radio transmitted from the transmission antenna 112.

Moreover, the information that is sent by the paging channel in order to call the mobile unit is programmed by the frame assembler circuit 113 into a transmission frame format to which has been attached various kinds of control information, etc., after which it is multiplied in the multiplier 115 with a spread code that has a lower speed than the communications channel and which has been generated from the spread code generator circuit 114 for the paging channel, and spread to a signal having a narrower band than the communications channel. The spread paging channel signal is band limited by the band limiting filter 116 that has a narrower band than the communications channel and waveform shaped, and is converted into an analog signal by the DA converter circuit 117 that has a slower speed than the communications channel and then output to the mixer 118.

The paging channel signal that has been converted to an analog signal is converted (modulated) in the mixer 118 to a modulated signal having a carrier wave frequency differing from [that for] the communications channel that has been output by the carrier wave generator circuit 119, synthesized together with the signal on the communications channel by the synthesizer circuit 110, amplified by the power amplifier circuit 111 that is used commonly by the communications channel, and is radio transmitted from the transmission antenna 112.

In the following, the configuration of the mobile unit receiver of the spread spectrum portable telephone apparatus in one configuration of an embodiment of the present invention with is described with reference to FIG. 2. In the mobile unit receiver 120 diagrammed in FIG. 2, 121 is a reception antenna that receives radio signals transmitted from the base station transmitter 101. 122 is a low noise amplifier circuit that amplifies the radio signal (either received data or paging channel signal) received. 123 is a detector circuit that detects and demodulates the received signals, using the signal of the station generated frequency. And 124 is a station generator circuit that generates signals at the station generated frequency.

Moreover, 125, is a high speed AD converter circuit that converts the detected analog reception data to a digital signal. 126 is a broadband reception filter that waveform shapes the reception data that have been converted to the digital signal. 127 is a correlator that, by multiplying the spread code and the waveform shaped reception data and integrating them, despreads and demodulates [said data or signal]. 128 is a spread code generator circuit that generates (high speed) spread signals (specific to each mobile unit) that are allotted to each mobile unit. 129 is a frame resolving circuit that extracts reception data or paging information from the frame format.

Moreover, 130 is a (low speed) AD converter circuit for the paging channel that converts the detected analog paging channel signal to a digital signal. 131 is a (narrow band) reception filter for the paging channel that waveform shapes the paging information that has been converted to the digital signal. 132 is a correlator that multiplies the spread code and the waveform shaped paging information and integrates them, thereby despreading (correlating) [the information] and demodulating [the signal]. 133 is a spread code generator circuit that generates spread codes (specific to each mobile unit) that are allotted to each of the mobile units of a slower speed than the spread code from the spread code generator circuit 128. 134 is controlling means (described below in greater detail) that, in addition to controlling the spread code generator circuits 128 and 133 and the station generator circuit 124, control the turning on and off of the power to the AD converter circuit 125, the reception filter 126, the correlator 127, and the spread code generator circuit 128, which are for communications channel transmissions, while waiting for receptions.

Described next is the operation of the mobile unit receiver of the spread spectrum portable telephone apparatus configured as set forth above with reference to FIG. 2. In the mobile unit receiver 120, while waiting for a reception, the call state is monitored so that the paging channel can be received, and the communications channel is received when communications begin. The operation while waiting will be described next. A paging channel signal that is captured by the reception antenna 121 is amplified by the low noise amplifier 122, and, in the detection circuit 123, detected and demodulated, by means of the controls of the controlling means 134, using the signals at the station generated frequency output from the station generator circuit 124 and is then converted to a baseband paging signal.

The paging channel signal that is converted to the baseband signal passes through the AD converter circuit 130 that operates at a lower speed than is us ed on the communications channel and is converted to digital paging information, whereupon it is band limited by a reception filter 131 that operates at a lower speed and has a narrower band than are used on the communications channel and is waveform shaped. The waveform shaped paging information, in the correlator 132, and with the use of the low speed spread code output by the spread code generator circuit 133 according to the control of the controlling means 134, is despread (correlated) and thereby decoded, whereafter it passes through the frame resolving circuit 129, and the paging information is extracted.

It is possible to operate the AD converter circuit 130, reception filter 131, correlator 132, and spread code generator circuit 133, that are used when receiving paging channel signals, at a lower speed than that which is used when receiving the communications channel. Also, while waiting, the power is cut off to the AD converter circuit 125, reception filter 126, correlator 127, and spread code generator circuit 128 that are for receiving the communications channel. The on and off control of the power to these units is performed by the controlling means 134.

When a call to the mobile unit is detected while receiving the paging channel, the power is turned on to the AD converter circuit 125, the reception filter 126, the correlator 127, and the spread code generator circuit 128 that are for receiving the communications channel, and reception of the communications channel is started, effecting the call state. The following is the description of the operation during a call, after the power has been turned on. The communications channel signal that is captured by the reception antenna 121 is amplified by the low noise amplifier 122, detected and demodulated in the detector circuit 123 using the signals having the station generated frequency output by the station generator circuit 124 according to the control of the controlling means 134 and converted to a baseband signal.

When the communications channel has been received, unlike when the aforesaid paging channel is being received, the communications channel analog signal that has been converted to a baseband signal in the detector circuit 123 is converted to digital reception data by the AD converter circuit 125 and waveform shaped by the reception filter 126. The waveform shaped communications channel reception data are, in the correlator 127, despread (correlated) using the spread code output by the spread code generator circuit 128 according to the control of the controlling means 134, and the reception data are extracted through the frame resolving circuit 129.

As has been set forth in the foregoing, when a configuration of an embodiment of the present invention is employed, by providing a paging channel that has a narrower band than the communications channel, the operating speed of the circuit elements that operate while waiting in the mobile unit receiver can be made low, by which means it becomes possible to decrease the power consumption while waiting, so that wait times can be obtained that are longer than [those of] a conventional spread spectrum portable telephone apparatus.

Furthermore, as described in the foregoing, in the base station transmitter, a carrier wave generator circuit for the communications channel and a carrier wave generator circuit for the paging channel are provided separately, and made so that transmissions are made using different carrier wave frequencies. It may be made, however, so that the same carrier wave generator circuit is used for both the communications channel and the paging channel, so that the same carrier wave frequency is used.

By giving the spread spectrum portable telephone apparatus in the present invention a configuration such as is described in the foregoing, and, more particularly, by providing an AD converter circuit, reception filter, correlator, and spread code generator circuit for receiving the paging channel that are slower and that have a narrower band than that which is used when receiving the communications channel, the power may be turned off to the said circuits for the communications channel while waiting for a reception, so that there is little battery depletion during long periods of waiting, and so that long wait times can be realized.

What is claimed is:

1. A spread spectrum portable telephone apparatus for use in a code-division-multiple-access (CDMA) type of mobile unit receiver, the apparatus comprising:

means for receiving and detecting radio signals transmitted in a CDMA mode, and a plurality of data reception means for analog-to-digital (AD) converting the detected reception signals, for waveform shaping the AD converted signals, for despreading and decoding the shaped signals with a spread code, for frame analyzing the decoded signals, and for extracting the reception data from the frame-analyzed signals, wherein the plurality of data reception means includes:
communication data reception means for receiving communications signal over a communication channel using a communications band; and
paging data reception means for receiving paging signals over a paging channel that has a narrower band than the communications band, and when waiting, only the paging data reception means has the power turned on thereto for waiting for an incoming call.

2. The spread spectrum portable telephone apparatus as claimed in claim 1, wherein the paging data reception means for the paging channel includes:
a low speed AD converter circuit that AD converts the received signals to digital paging signals and outputs the digital paging signals,
a narrow band reception filter that waveform shapes the AD converted paging signals, and
a correlator that despreads and decodes the waveform shaped paging signals with a spread code generated by a low speed spread code generating circuit.

3. A spread spectrum portable telephone apparatus for use with a code-division-multiple-access (CDMA) type of base station transmitter comprising:
a plurality of data transmission means for receiving transmission data from a plurality of lines and formatting the received transmission data from each line into a frame format, for multiplying with a spread code specific to each line to generate spread signals, for waveform shaping the spread signals, for digital-to-analog (DA) converting the waveform shaped signals to generate analog signals, and for transmitting the analog signals as radio signals modulated with a carrier wave, wherein the plurality of data transmission means include:
paging data transmission means for transmitting paging signals over a paging channel having a paging band and
communications data transmission means for transmitting communications signals over a communications channel having a communications band, wherein the paging band is narrower than the communications band, and
wherein the paging signals are transmitted to mobile units in which only paging channel data reception means of the mobile units have power turned on.

4. The spectrum portable telephone apparatus as claimed in claim 3, wherein the paging data transmission means for the paging channel includes:
a multiplier that receives paging information in the received transmission data that has been formatted in a frame format and multiplies the formatted paging information with a spread signal generated by a low speed spread code generating circuit,
a narrow band restricting filter that waveform shapes the spread signal,
a DA converter circuit that converts the waveform shaped digital signals into analog signals, and
a mixer that modulates the analog signals with a carrier wave and transmits the analog signals as radio signals.

5. A spread spectrum portable telephone apparatus for use in a code-division-multiple-access (CDMA) type of mobile unit receiver, the apparatus comprising:
a plurality of data reception means for analog-to-digital (AD) converting the detected reception signals, for waveform shaping the AD converted signals, for despreading and decoding the shaped signals with a spread code, for frame analyzing the decoded signals, and for extracting the reception data from the frame-analyzed signals, wherein the plurality of data reception means includes:
communication data reception means for receiving communications signal over a communication channel using a communications band; and
paging data reception means for receiving paging signals over a paging channel that has a narrower band than the communications band, and when waiting, only the paging data reception means has the power turned on thereto for waiting for an incoming call;
wherein the paging data reception means for the paging channel includes:
a low speed AD converter circuit that AD converts the received signals to digital paging signals and outputs the digital paging signals;
a narrow band reception filter that waveform shapes the AD converted paging signals; and
a correlator that despreads and decodes the waveform shaped paging signals with a spread code generated by a low speed spread code generating circuit.

6. A spread spectrum portable telephone apparatus for use with a code-division-multiple-access (CDMA) type of base station transmitter comprising:
a plurality of data transmission means for receiving transmission data and formatting the received transmission data into a frame format, for multiplying with a spread code to generate spread signals, for waveform shaping the spread signals, for digital-to-analog (DA) converting the waveform shaped signals to generate analog signals, and for transmitting the analog signals as radio signals modulated with a carrier wave, wherein the plurality of data transmission means include:
paging data transmission means for transmitting paging signals over a paging channel having a paging band and
communications data transmission means for transmitting communications signals over a communications channel having a communications band, wherein the paging band is narrower than the communications band; and
wherein the paging signals are transmitted to mobile units in which only paging channel data reception means of the mobile units have power turned on;
wherein the paging data transmission means for the paging channel includes:
a multiplier that receives paging information in the received transmission data that has been formatted in a frame format and multiplies the formatted paging information with a spread signal generated by a low speed spread code generating circuit,
a narrow band restricting filter that waveform shapes the spread signal,
a DA converter circuit that converts the waveform shaped digital signals into analog signals, and
a mixer that modulates the analog signals with a carrier wave and transmits the analog signals as radio signals.

\* \* \* \* \*